United States Patent [19]

Song

[11] Patent Number: 5,161,030

[45] Date of Patent: Nov. 3, 1992

[54] METHOD AND CIRCUIT FOR ENHANCING IMAGE QUALITY OF A VIDEO TAPE RECORDER (VTR) USING MOTION ADAPTIVE SPECTRUM FOLDING METHOD

[75] Inventor: Tong-Ill Song, Suwon, Rep. of Korea

[73] Assignee: Samsung Electronics Co., Ltd, Suweon, Rep. of Korea

[21] Appl. No.: 632,083

[22] Filed: Dec. 21, 1990

[30] Foreign Application Priority Data

Dec. 22, 1989 [KR] Rep. of Korea ............... 1989-19316

[51] Int. Cl.$^5$ .............................................. H04N 9/79
[52] U.S. Cl. ...................................... 358/310; 358/330
[58] Field of Search ............... 358/310, 313, 314, 330, 358/11, 13, 31

[56] References Cited

U.S. PATENT DOCUMENTS 4,831,463  5/1989  Faroudja .......................... 358/310

*Primary Examiner*—Robert L. Richardson
*Assistant Examiner*—Huy Nguyen
*Attorney, Agent, or Firm*—Robert E. Bushnell

[57] ABSTRACT

A picture quality improvement circuit and method for a video tape recorder wherein the luminance and chrominance signals are separated from an input video signal, and the luminance signal is adaptively pre-filtered based on whether the image of the video signal is a still image or a motion image. The pre-filtered luminance signal is then sampled and folded in response to a folding carrier frequency signal in a spectrum folding circuit. The output of the spectrum folding circuit is low pass filtered and then FM modulated. The chrominance signal has its carrier frequency converted and is then low pass filtered. The converted and filtered chrominance signal is added to the modulated signal and recorded on a video tape. A played back signal is high pass filtered, demodulated, unfolded and filtered according to whether there is motion in the signal. The played back signal is also low pass filtered, carrier frequency converted and added to the filtered unfolded signal to be provided for display.

20 Claims, 6 Drawing Sheets

METHOD AND CIRCUIT FOR ENHANCING IMAGE QUALITY OF A VIDEO TAPE RECORDER (VTR) USING MOTION ADAPTIVE SPECTRUM FOLDING METHOD

BACKGROUND OF THE INVENTION

The present invention relates to a signal processing method in VTR systems, and more particularly to a method and a circuit which can enhance an image quality of a Video Tape Recorder (hereinafter, referred to as VTR) by using motion adaptive frequency spectrum folding method which records after compressing a bandwidth of a signal received from a signal source such as a camera, and by using the motion adaptive frequency spectrum unfolding method for restoring to original signal during playback.

In conventional home VTR's, the definition of the luminance signal of restored images by playing back is degraded due to characteristics of playback recording head or tape which limit the recording bandwidth.

SUMMARY OF THE INVENTION

It is an object of this invention to provide a method and circuit to enhance the definition of luminance signal with existing recording bandwidth by using motion adaptive frequency spectrum folding method to compress bandwidth of a signal received from a signal source such as a camera and using motion adaptive frequency spectrum unfolding method during playback to restore original signal.

It is another object of this invention to provide a method of recording which can be played back by a conventional VTR to maintain compatibility.

In order to perform the objects, the inventive method includes the steps of:

(a) separating an input signal into luminance and chrominance signals by a "Y/C" separating circuit;

(b) filtering the above separated signal by a motion adaptive pre-filtering circuit; and folding the frequency spectrum of the filtered (c) sampling signal by a folding carrier frequency $f_s = 7$ $(2n+1)f_h/2 = (2p+1)f_p/2$ (where $f_h$=line frequency and $f_p$=frame frequency, and n, p are integers;

(d) removing high frequency components by passing the signal through a first low pass filter; (e) after modulating by a "FM" modulator after processing the step (d), combining the signal with the modulated chrominance signal which is processed through the "Y/C" separator, color under recording processing circuit and a second low pass filter to record the combined signal on a tape;

(f) during playback passing the restored "RF" signal through a high pass filter and demodulating the signal by a "FM" demodulator;

(g) unfolding the frequency spectrum by sampling the signal by an unfolding carrier frequency $f'_s = (2n+1)f_h/2 = (2p+1)f_p/2$ (where $f_h$=line frequency and $f_p$=frame frequency, and n, p are integers); and (h) after removing unnecessary frequency spectrum components by a motion adaptive post filter circuit, combining the signal with the modulated chrominance signal from restored "RF" signal which is processed through a third low pass filter and color under playback processing circuit.

BRIEF DESCRIPTION OF THE DRAWINGS

For a better understanding of the invention and to show how the same may be carried into effect, reference will now be made, by way of example, to the accompanying diagrammatic drawings, in which.

DESCRIPTION OF THE PREFERRED EMBODIMENTS

Figure 1:
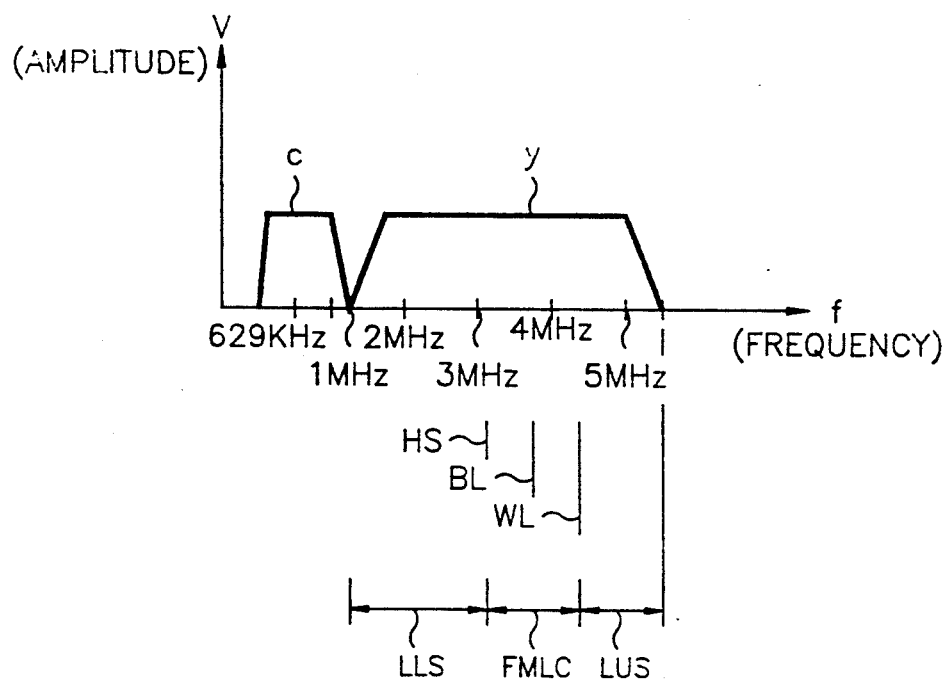
FIG. 1 is a frequency spectrum of a recording signal in a VTR using conventional color under method.

Turning now more descriptively to the drawings, FIG. 1 is a frequency spectrum of a recording signal in a VTR using conventional color under method which is a characteristic drawing of the relation between frequency "f" and amplitude, where "C" is a band of chrominance AM carrier and "Y" is a band of luminance in which "HS" is a horizontal synchronization signal, "BL" is black level, and "WL" is the white level. Luminance lower side band "LLS" of the luminance signal is a region from the starting point of the luminance band "Y" to the starting point of the horizontal synchronization band, "FM" luminance carrier frequency deviation band "FMLC" is a region from the horizontal synchronization band to white level band "WL", and luminance upper side band "LUS" is a region from the "FM" luminance carrier frequency deviation band "FMLC" to the end of luminance band "Y".

Figure 2:
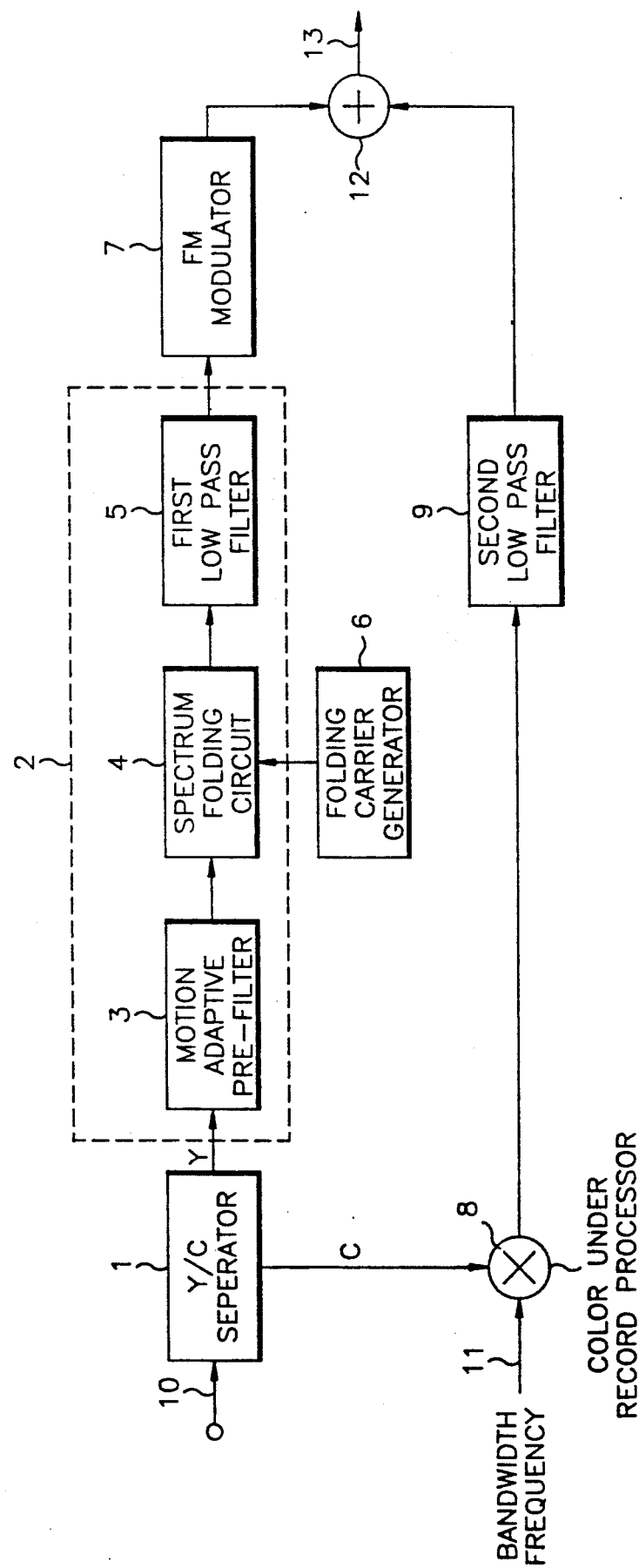
FIG. 2 is a block diagram of a recording signal processing in VTR according to the invention.

Referring to FIG. 2, a "Y/C" separator (1) separates chrominance and luminance signals from the complex image signal input through a video input (10). A motion adaptive prefilter circuit (3) filters adaptively the luminance signal separated by the "Y/C" separator (1) according to the movement of the image. A folding carrier generator (6) generates a folding carrier signal in order to fold that portion of the original signal selected by the motion adaptive pre-filter circuit (3). A spectrum folding circuit (4) folds that portion of the spectrum component selected and output by the motion adaptive pre-filter circuit (3) according to the carrier signal generated by the folding carrier generator (6). A first low pass filter (LPF) 5 which low pass filters the combined original and folding signal in the spectrum folding circuit (4). A "FM" modulator (7) modulates the frequency of the output of the first low pass filter (5). A color under recording processing circuit (8) converts the chrominance signal separated by the "Y/C" separator (1) to 629KHz frequency band. A second low pass filter (9) generates only 629KHz converted carrier frequency band by low pass filtering the output of the color under recording processing circuit (8). A first adder (12) adds the outputs of the "FM" modulator (7) and the second low pass filter (9) and then outputs "RF" signal to be recorded on a tape.

Figure 3:
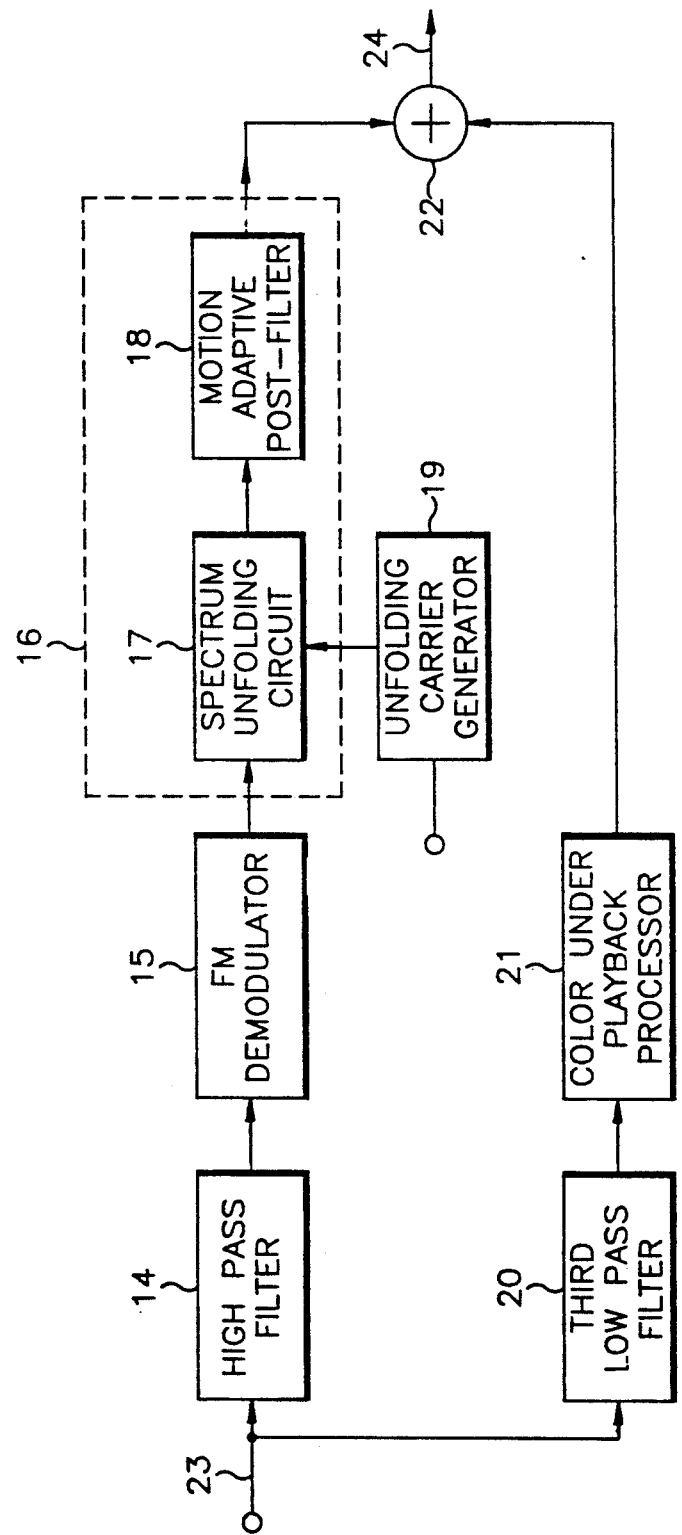
FIG. 3 is a block diagram of a playback signal processing in VTR according to the invention.
Figure 4:
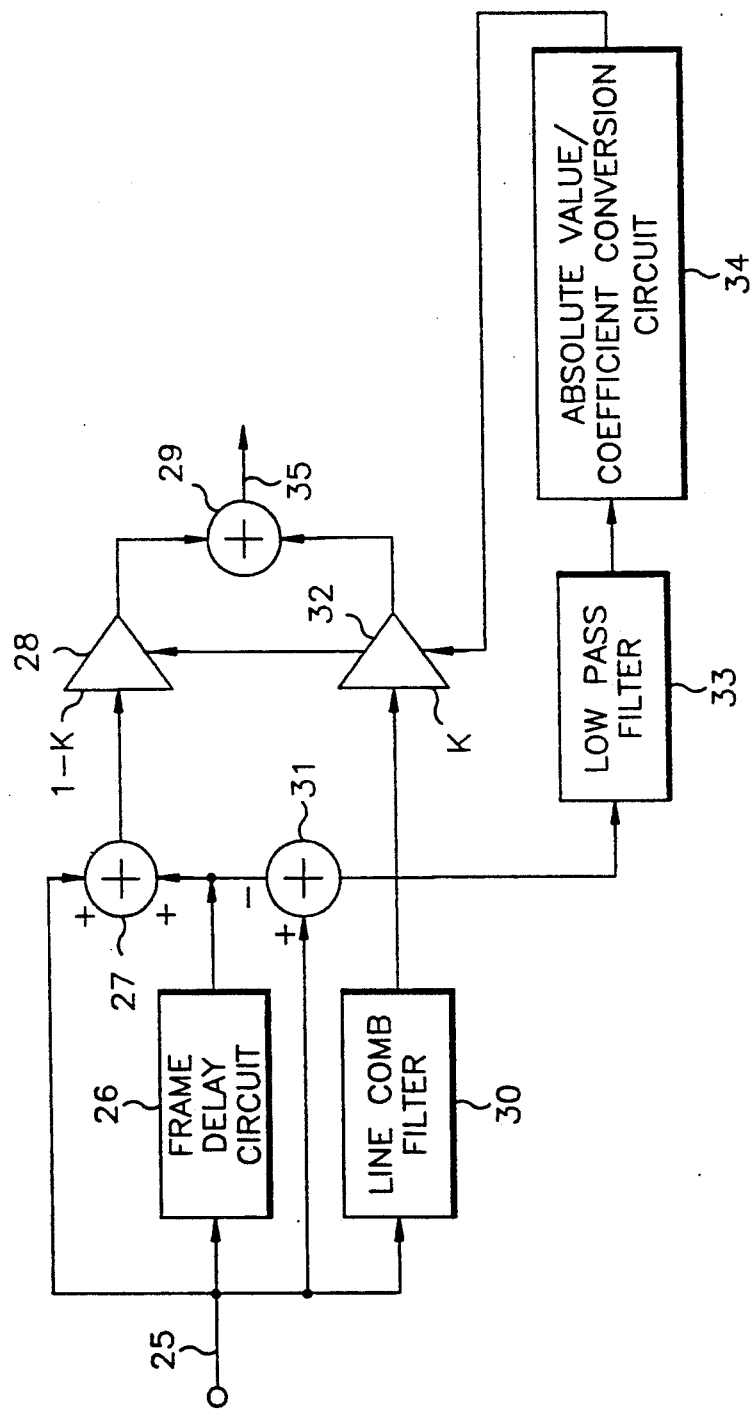
FIG. 4 is a block diagram of a detailed execution of motion adaptive pre-filtering and post-filtering in VTR recording signal processing and playback signal processing system according to the invention.

Referring to FIG. 3, a high pass filter (14) plays back the "RF" video signal recorded on the tape and inputs the signal to the input terminal, thereafter extracts a "FM" modulated luminance signal "Y" by high pass filtering. A "FM" demodulator (15) demodulates the output of the high pass filter 14. An unfolding carrier generator (19) generates an unfolding carrier frequency according to the input of a playback synchronization signal. A spectrum unfolding circuit (17) unfolds the output of the "FM" demodulator (15), and restores the signal to the original signal and folded signal component according to the carrier frequency generated by the unfolding carrier generator (19). A motion adaptive post-filter circuit (18) restores the high frequency components of the output of the spectrum unfolding circuit (17) by removing the folded component. A third low pass filter (20) filters by passing low frequency of the signal restored from the tape inputted to the input terminal (23). A color under playback processing circuit (21) converts the output signal of the third low pass filter (20) to the original chrominance signal. A second adder (22) adds the output of the color under playback processing circuit (21) and the output of the motion adaptive post filter circuit (18), and then outputs the playback image signal Referring to FIG. 4, A frame buffer (26) stores and delays the input signal of a input terminal 25 by frame unit. A line comb filter (30) comb-filters the input signal of the input terminal (25). A subtractor (31) subtracts the output of the frame buffer (26) from the input signal of the input terminal (25). An adder (27) adds the output of the frame buffer (26) and the output of the input terminal (25). A low pass filter (33) filters by passing the low frequency of the output of the subtractor (32). An absolute value and coefficient conversion circuit (34) outputs a value "K" according to still or motion image by taking the absolute value and converting coefficient of the output of the low pass filter (33). A gain control circuits (28) and (32) controls the gains of the output of the line comb filter (30) and the output of the adder (7) according to the output of the absolute value and coefficient conversion circuit (34). An adder (29) adds the outputs of the gain control circuits (28) and (32).

Figure 5:
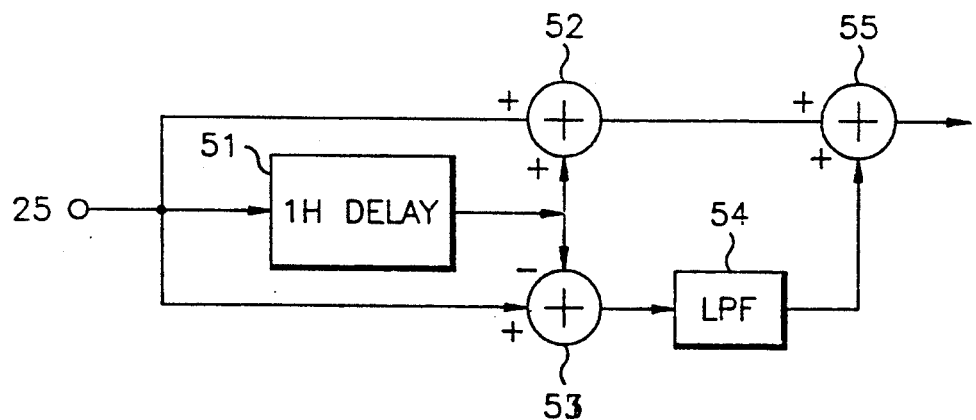
FIG. 5 is a detailed block diagram of the line comb filter (30) shown in FIG. 4 according to the invention.

Referring to FIG. 5. a "1H" delay circuit (51) delays the input signal of the input terminal (25) by one horizontal synchronization period. An adder (52) adds the "1H" delayed signal and the input signal. A subtractor (53) subtracts a delayed signal by one horizontal synchronization period by a "1H" delay circuit (51) from an input signal of the input terminal (25). A low pass filter (54) filters by passing the low frequency of the output of the subtractor (53). An adder (55) adds the outputs of the low pass filter (54) and the adder (52).

Figure 6A:
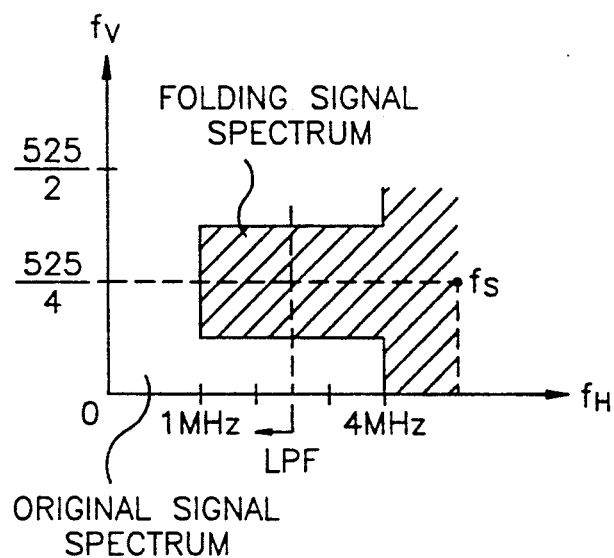
FIGS. 6A and 6B show frequency bandwidth occupancy rates of an original signal and folded signal after spectrum folding in horizontal-vertical frequency domain and vertical-time frequency domain in case of motion image when processing a recorded signal in VTR according to the invention.
Figure 6B:
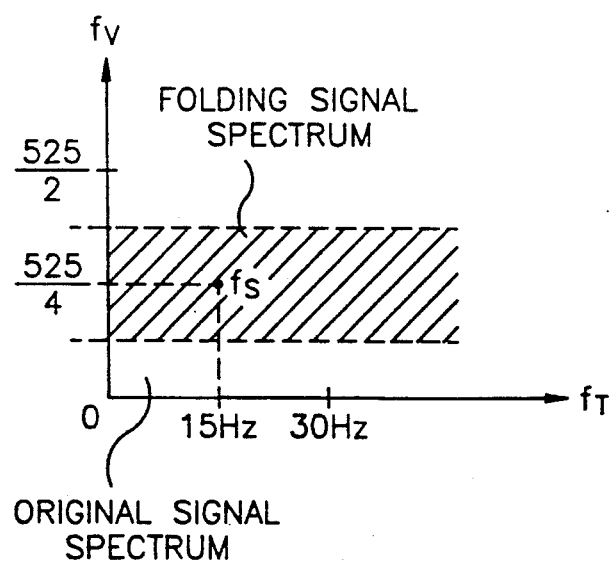

FIGS. 6A and 6B are frequency bandwidth occupancy rates of an original signal and folded signal after spectrum folding in horizontal-vertical frequency domain and vertical-time frequency domain in case of motion image according to the invention.

Figure 7A:
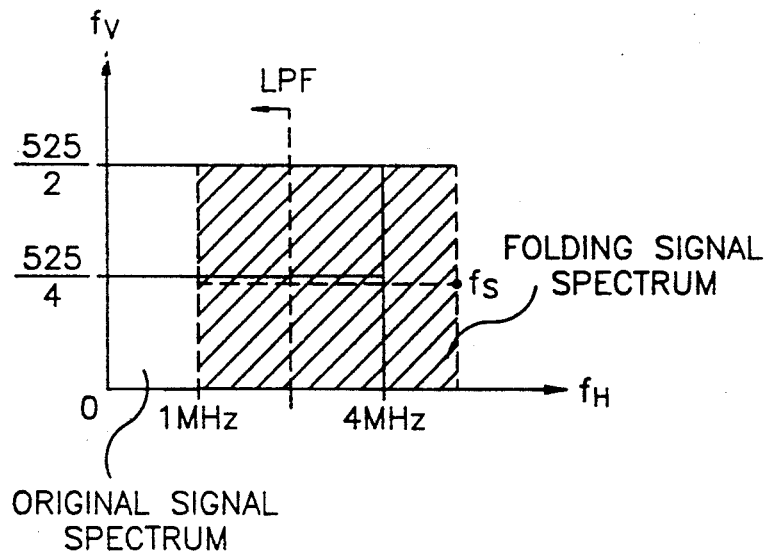
FIGS. 7A and 7B show frequency bandwidth occupancy rates of an original signal and folded signal after spectrum folding in horizontal-vertical frequency domain and vertical-time frequency domain in case of still image when processing a recorded signal in VTR according to the invention.
Figure 7B:
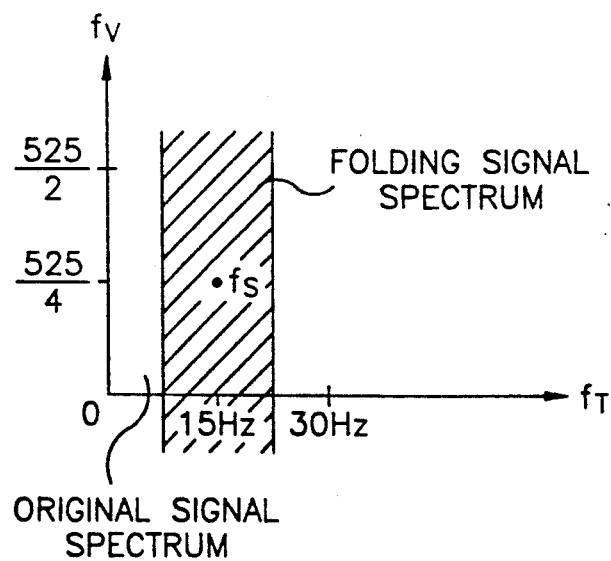

FIGS. 7A and 7B are the frequency bandwidth occupancy rate of an original signal and folded signal after spectrum folding in horizontal-vertical frequency domain and vertical-time frequency domain in case of still image according to the invention.

Referring to FIG. 2, a description of an operation of VTR recorded signal processing is as follows. When a complex image signal is entered via input terminal (10) from the image signal source, the complex image signal is separated into luminance signal "Y" and chrominance signal "C" by the "Y/C" separator (1). The "Y/C" separator can be implemented in many ways. For example, as the simplest method, when the signal is passed through a LPF, the signal "Y" is obtained and when the signal passes through a BPF, the chrominance signal is obtained. The "Y/C" separator is also possible using a line comb filter.

The separated "Y" signal is filtered by the motion adaptive pre-filter circuit (3). If the "Y" signal is a motion image, the signal difference between the one frame-delayed signal and the current input signal of the input terminal (25) in FIG.4, that is, the output of the subtractor (31) is large, and after passing through the LPF (33), k = 1 value is output by the absolute value circuit and coefficient conversion circuit (34). The output signal of the output terminal (35) at this time is obtained through line comb filter (30) and the gain control circuit (32) of the input signal.

The filter passes only the spectrum component of the original signal shown in FIGS. 6A and 6B, and attenuates other spectrum components. The output signal of the output terminal (35) is sampled by a sampling signal generated by the folding carrier generator (6) and its spectrum is folded by the spectrum folding circuit (4) (the slant-lined region in FIGS. 6A and 6B). Therefore, since the original signal and the folded signal are distinguished according to the characteristics of this filter in the three-dimensional frequency spectrum, they can be separated by a filter having the same characteristic during the processing of the playback signal.

When the mixed signal is passed through the one-dimensional first low pass filter (5), the frequency component corresponding to the passing band of the low pass filter is obtained and contains the high frequency component in a shape of a folded signal. The output of the low pass filter (5) is "FM" modulated by the "FM" modulator (7) and is added to the chrominance signal, which is passed through the low pass filter (9) and converted to 629KHz carrier frequency, by the first adder (12) and recorded on a tape. Therefore, it is possible to play back the high frequency component of the horizontal frequency axis within the existing recording band. However, in case of motion image, since the high frequency component of the original signal in the diagonal direction are removed by the line comb filter (30), a slight degradation of the definition of the image may occur.

Referring to FIG. 3, a description of an operation of VTR recorded signal processing is as follows. A "RF" playback signal obtained via head from the tape is inputted through the input terminal (23) and "FM" modulated "Y" signal is obtained by the high pass filter (14), and this signal is demodulated by the "FM" demodulator (15). The demodulated signal is composed of the low frequency component and folded signal of the original signal. The sampling signal generated by the unfolding carrier generator (19) according to the playback synchronization input signal, is the same as the signal generated by the folding carrier generator (6), and its spectrum is unfolded by the spectrum unfolding circuit (17)

and the original signal plus the folded signal components in FIG. 6A is restored. K=1 are selected by the motion adaptive post-filter circuit (18), and the characteristic identical to the pre-filter is obtained to remove the folded signal component, and the high frequency component of the original signal is restored The restored signal is then added to the chrominance signal obtained by conventional VTR color under playback processing circuit (21) and the video playback signal is obtained in the second adder (22).

If the "Y" signal is a still image, the signal difference between a frame-delayed signal and the current input signal of the input terminal (25), that is, the output of the subtractor (31) is not generated, and K=0 is selected by the low pass filter (33) and the absolute value and coefficient conversion circuit (34). Therefore, one frame-delayed signal and the input signal of the input terminal (25) is added by the adder (27) and is output via gain control circuit (28). The filter characteristic for this case is that it passes the original spectrum components shown in FIGS. 7A and FIG. 7B while attenuating other frequency components. The output signal of the output terminal (35) is sampled by a sampling signal generated by the folding carrier generator (6), and its spectrum is folded by the spectrum folding circuit (4) (the slant-lined region in FIGS. 6A and 6B). Therefore, since the original signal and the folded signal are distinguished according to the characteristics of this filter in the three-dimensional frequency spectrum, they can be separated by a filter having the same characteristic during the processing of the playback signal.

When the mixed signal is passed through the one-dimensional first low pass filter (5), the frequency component corresponding to the passing band of the low pass filter is obtained and contains the high frequency component in a shape of a folded signal. The output of the low pass filter (5) is added to the chrominance signal which is "FM" modulated by the "FM" modulator (7) and passed through the low pass filter (9) and converted to 629KHz carrier frequency, by the first adder (12) and recorded on tape. Therefore, it is possible to play back the high frequency component of the horizontal frequency within the existing recording band. In case of still image, the whole band of the original signal is restored without loss to playback a high definition signal.

Referring to FIG. 3, a description of an operation of VTR recorded signal processing is as follows. A "RF" playback signal obtained via head from the tape is inputted through the input terminal (23) and "FM" modulated "Y" signal is obtained by the high pass filter (14), and this signal is demodulated by the "FM" demodulator (15). The demodulated signal is composed of the low frequency component and folded signal of the original signal. The sampling signal generated by the unfolding carrier generator (19) according to the playback synchronization input signal, is the same as the signal generated by the folding carrier generator (6), and its spectrum is unfolded by the spectrum unfolding circuit (17) and the original signal plus the folded signal components in FIG. 6A is restored. K=0 is selected by the motion adaptive post-filter circuit (18), and the characteristic identical to the pre-filter is obtained to remove the folded signal component, and the high frequency component of the original signal is restored. The restored signal is then added to the chrominance signal obtained by conventional VTR color under playback processing circuit (21) and the video playback signal is obtained in the second adder (22). Appropriate prefilter and post-filter characteristics can be chosen and separated depending on whether the motion image signal or still image signal restores the original image signal with high fidelity.

One skilled in the art can easily design a higher performance filter circuit by raising the orders of the motion adaptive pre-filtering and post-filtering of the frame comb filter or line comb filter without departing from the scope and spirit of the invention.

As described in the foregoing, the invention records the signal obtained from a signal source such as a camera using the motion adaptive frequency folding method to bandwidth-compress the signal, and for playback, restores the signal using the motion adaptive frequency spectrum unfolding method to greatly improve the definition of the luminance signal using existing recording bandwidth to enhance the picture quality. The invention also have an advantage of being able to play back the signals recorded using this method by a conventional VTR to maintain compatibility.

What is claimed is:

1. A picture quality improvement circuit for a video tape recorder, said circuit comprising:
   a luminance/chrominance separator for receiving a video signal and outputting separated luminance and chrominance signals;
   a motion adaptive pre-filter for receiving and adaptively filtering said separated luminance signal based on whether an image represented by said video signal is a still image or an image in motion and for outputting an adaptively filtered luminance signal;
   a folding carrier generator for generating a folding carrier signal;
   a spectrum folding circuit for sampling and folding said adaptively filtered luminance signal in response to said folding carrier signal and for outputting a combined signal comprised of said adaptively filtered luminance signal and a folded signal;
   a first low pass filter for receiving and removing high frequency components of said combined signal and for outputting a low frequency component of said combined signal;
   frequency modulating means for modulating said low frequency component to generate a modulated signal; and
   means for combining said separated chrominance signal and said modulated signal to be recorded on a tape.

2. The circuit as claimed in claim 1, wherein said motion adaptive pre-filter comprises:
   means for delaying said separated luminance signal for one frame period of said video signal and for outputting a frame delayed luminance signal;
   means for receiving said separated luminance signal and said frame delayed luminance signal and for outputting a first difference signal and a first sum signal in response thereto;
   low pass filter means for receiving and filtering said first difference signal;
   means for generating a gain control signal in response to an output signal of said low pass filter means;
   a line comb filter means for receiving said separated luminance signal and for outputting a comb-filtered luminance signal;
   means for receiving said first sum signal, said comb-filtered luminance signal and said gain control signal and for outputting a gain controlled sum signal and a gain controlled comb-filtered luminance signal; and means for combining said gain controlled sum signal and said gain controlled comb-filtered luminance signal to output said adaptively filtered luminance signal.

3. The circuit as claimed in claim 2, wherein said means for delaying comprises a frame buffer circuit.

4. The circuit as claimed in claim 2, wherein said gain control signal has a coefficient value "K" equal to 1 if said difference signal has a large value due to image motion in said video signal.

5. The circuit as claimed in claim 2, wherein said gain control signal has a coefficient value "K" equal to 0 if no difference signal is output, wherein no difference signal is generated when said video signal is representative of a still image.

6. The circuit as claimed in claim 4, wherein said gain control signal has a coefficient value "K" equal to 0 if no difference signal is output, wherein no difference signal is generated when said video is representative of a still image.

7. The circuit as claimed in claim 2, wherein said line comb filter means comprises:

means for delaying said separated luminance signal for one line period of said video signal and for outputting a line delayed luminance signal;

means for receiving said line delayed luminance signal and said separated luminance signal and for outputting a second sum signal and a second difference signal in response thereto;

means for low pass filtering said second difference signal and for outputting a filtered second difference signal; and means for combining said second sum signal and said filtered second difference signal to output said comb-filtered luminance signal.

8. The circuit as claimed in claim 1, wherein said means for combining said separated chrominance signal and said modulated signal comprises:

a color under recording processing circuit for converting a carrier frequency band of said separated chrominance signal to a 629KHz carrier frequency band;

a second low pass filter for filtering an output of aid color under recording processing circuit; and an adder for combining an output of said second low pass filter and said modulated signal.

9. The circuit as claimed in claim 1 further comprising:

a high pass filter for receiving and filtering a signal played back from said tape and for outputting a high pass filtered signal;

an FM demodulating means for demodulating said high pass filtered signal and outputting a demodulated signal;

an unfolding carrier generator for generating an unfolding carrier signal;

a spectrum unfolding, circuit for receiving said demodulated signal and for separating and outputting said adaptively filtered luminance signal and said folded signal from said demodulated signal by sampling and unfolding said demodulated signal in response to aid unfolding carrier signal;

a motion adaptive post-filter for receiving said separated adaptively filtered luminance signal and said separated folded signal, for attenuating said separated folded signal, for restoring high frequency components of said separated adaptively filtered luminance signal and for outputting a restored luminance signal;

a third low pass filter for receiving said signal played back from said tape and for outputting a low pass filtered signal;

a color under playback processing circuit for receiving said low pass filtered signal and for outputting a restored chrominance signal; and means for combining said restored luminance signal and said restored chrominance signal and for outputting a restored video playback signal for display.

10. The circuit as claimed in claim 9 wherein said folding carrier signal is equal to said unfolding carrier signal.

11. A method for improving picture quality of a signal recorded and played back by a video tape recorder, said method comprising the steps of:

separating a input video signal into luminance and chrominance signals;

adaptively filtering said luminance signal based on whether an image represented by said input video signal is a still image or an image in motion and for outputting an adaptively filtered luminance signal;

sampling and folding the frequency spectrum of said adaptively filtered luminance signal in response to a folding carrier frequency signal and generating a combined signal comprised of said adaptively filtered luminance signal and a folded signal;

removing high frequency components of said combined signal and outputting a low frequency component of said combined signal;

frequency modulating said low frequency component and generating a modulated signal; and combining said separated chrominance signal and said modulated signal for recording on a tape.

12. The method as claimed in claim 11, wherein said adaptively filtering step comprises the steps of:

delaying said separated luminance signal for one frame period of aid input video signal and outputting a frame delayed luminance signal;

receiving said separated luminance signal and said frame delayed luminance signal and outputting a first difference signal and a first sum signal in response thereto;

low pass filtering said first difference signal;

generating a gain control signal in response to low pass filtered difference signal;

receiving said separated luminance signal and outputting a line combfiltered luminance signal;

receiving said first sum signal, said line comb-filtered luminance signal and said gain control signal and outputting a gain controlled sum signal and a gain controlled line comb-filtered luminance signal; and combining said gain controlled sum signal and said gain controlled line comb-filtered luminance signal and outputting said adaptively filtered luminance signal.

13. The method as claimed in claim 12, wherein said step of receiving said separated luminance signal and outputting a line comb-filtered luminance signal comprises the steps of:

delaying said separated luminance signal for one line period of said input video signal and outputting a line delayed luminance signal;

receiving said line delayed luminance signal and said separated luminance signal and outputting a second sum signal and a second difference signal in response thereto;
low pass filtering said second difference signal and outputting a filtered second difference signal; and
combining said second sum signal and said filtered second difference signal to output said line comb-filtered luminance signal.

14. The method as claimed in claim 11, wherein said step of combining said separated chrominance signal and said modulated signal comprises the steps of:
converting a carrier frequency band of said separated chrominance signal to a 629KHz carrier frequency band for output as a converted chrominance signal;
low pass filtering converted chrominance signal; and
combining said low pass filtered converted chrominance signal and said modulated signal.

15. The method as claimed in claim 11 further comprising the steps of:
a high pass filtering a signal played back from said tape and outputting a high pass filtered signal;
FM demodulating said high pass filtered signal and outputting a demodulated signal;
generating an unfolding carrier frequency signal;
sampling and unfolding said demodulated signal in response to said unfolding carrier frequency signal to separate for outputting said adaptively filtered luminance signal and said folded signal from said demodulated signal;
motion adaptive post-filtering said separated adaptively filtered luminance signal and said separated folded signal, attenuating said separated folded signal, restoring high frequency components of said separated adaptively filtered luminance signal and outputting a restored luminance signal;

low pass filtering said signal played back from said tape and outputting a low pass filtered signal;
converting said low pass filtered signal and outputting a restored chrominance signal; and
combining said restored luminance signal and aid restored chrominance signal and outputting a restored video playback signal for display.

16. The method as claimed in claim 15 wherein said folding carrier frequency signal is equal to said unfolding carrier frequency signal.

17. The circuit as claimed in claim 1 wherein said folding carrier signal has a value $f_s=(2n+1)f/2=(2p+1)f_p/2$, where
$f_h$=line frequency;
$f_p$=frame frequency; and n and p are integers.

18. The circuit as claimed in claim 9 wherein said unfolding carrier signal has a frequency of $f'_s 32 (2+1)f_h/2=(2p+1)f_p/2$, where:
$f_h$=line frequency;
$f_p$=frame frequency; and
n and p are integers.

19. The method as claimed in claim 11 wherein said folding carrier frequency signal has a frequency of $f_s=(2n+1)f_h/2=(2p+1) f_p/2$, where:
$f_h$=line frequency;
$f_p$=frame frequency; and
n and p are integers.

20. The method as claimed in claim 15 wherein said unfolding carrier frequency signal has a frequency of $f'_s=(2n+1)f_h/2=(2p+1)f_p/2$, where:
$f_h$=line frequency;
$f_p$=frame frequency; and
n and p are integers.

* * * * *

UNITED STATES PATENT AND TRADEMARK OFFICE
CERTIFICATE OF CORRECTION

PATENT NO. : 5,161,030
DATED : Nov. 3, 1992
INVENTOR(S) : Tong-Ill Song

It is certified that error appears in the above-indentified patent and that said Letters Patent is hereby corrected as shown below:

| | | |
|---|---|---|
| Column 7, | Line 21, | After "video", Insert --signal-- ; |
| | Line 45, | Change "aid" to --said-- ; |
| | Line 65, | Change "aid" to --said-- ; |
| Column 8, | Line 41, | Change "aid" to --said-- ; |
| Column 10, | Line 5, | Change "aid" to --said-- ; |
| | Line 13, | After "(2n+1)", change "f" to --$f_h$-- ; |
| | Line 17, | Change "$f^1,32$" to --$f^1_s$-- . |

Signed and Sealed this

Fifth Day of September, 1995

Attest:

BRUCE LEHMAN

*Attesting Officer*    *Commissioner of Patents and Trademarks*